United States Patent [19]

Ohga

[11] Patent Number: 6,041,136
[45] Date of Patent: *Mar. 21, 2000

[54] IMAGE PROCESSING APPARATUS AND METHOD

[75] Inventor: Manabu Ohga, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/623,374

[22] Filed: Mar. 28, 1996

[30] Foreign Application Priority Data

Mar. 30, 1995 [JP] Japan .................................. 7-073335

[51] Int. Cl.$^7$ ...................................................... G06K 9/00
[52] U.S. Cl. ........................................... 382/162; 382/167
[58] Field of Search .................................... 382/162, 166, 382/167, 274; 358/515, 516, 518, 519, 520, 522; 395/131; 364/526; 345/155

[56] References Cited

U.S. PATENT DOCUMENTS

| | | | |
|---|---|---|---|
| 4,758,885 | 7/1988 | Sasaki et al. | 358/80 |
| 5,060,060 | 10/1991 | Udagawa et al. | 358/80 |
| 5,185,661 | 2/1993 | Ng | 358/515 |
| 5,282,046 | 1/1994 | Yamaguchi | 358/518 |
| 5,426,517 | 6/1995 | Schwartz | 358/520 |

*Primary Examiner*—Phuoc Tran
*Attorney, Agent, or Firm*—Fitzpatrick, Cella, Harper & Scinto

[57] ABSTRACT

An image processor includes an input device which inputs image data representing an image, and a judgement device judges a color distribution of the image on the basis of the input image data. A generation device generates a color mapping condition, on the basis of a combination condition of linear mapping and non-linear mapping according to the judged color distribution, and a processor performs a color mapping process by using the generated color mapping condition.

11 Claims, 10 Drawing Sheets

INPUT COLOR SIGNAL

DEVICE COLOR REPRODUCTION RANGE

FIG. 10

COLOR SPACE COMPRESSION CONTROL:

MAPPING BOUNDARY (0.0-1.0)　　0.5

NON-LINEAR DEGREE (1.0-3.0)　　3.0

COLOR SPACE COMPRESSION OPTION:

○ LINEAR
○ NON-LINEAR DEGREE (SMALL)
○ NON-LINEAR DEGREE (MEDIUM)
● NON-LINEAR DEGREE (LARGE)

OK

IMAGE PROCESSING APPARATUS AND METHOD

BACKGROUND OF THE INVENTION

1. Field of the Invention

The invention relates to an image processing apparatus and method for executing a color space compressing process to image data.

2. Related Background Art

A conventional color space compressing method is mainly classified into three methods as shown in conceptual diagrams and characteristics diagrams of FIGS. 13A to 13C.

Method of FIG. 13A

A method whereby the whole color is changed so that an input color signal out of a color reproduction range enters the range, thereby mapping into the color reproduction range.

Method of FIG. 13B

A method whereby the colors within the color reproduction range are not changed but the colors out of the range are mapped to a surface of the color reproduction range.

Method of FIG. 13C

A method whereby a faithful color reproduction range for executing a faithful color reproduction and a mapping color reproduction range for mapping the colors out of the faithful color reproduction range are provided within the color reproduction range and a mapping boundary serving as a boundary of the two ranges is changed in accordance with a ratio of the total number of pixels and the number of pixels out of the color reproduction range.

According to the method of FIG. 13A, since the relative relation among the colors is maintained, there is an advantage such that a color balance is not broken. On the other hand, however, there is a drawback such that the total color changes.

According to the method of FIG. 13B, although there is an advantage such that the colors within the color reproduction range are faithfully reproduced, there is a drawback such that the reproduction of the colors out of the range is limited to a size of the surface area of the color reproduction range, so that a gradation is lost.

The method of FIG. 13C keeps the advantages of the methods of FIGS. 13A and 13B and compensates for their drawbacks. However, in a case of a linear mapping, there is a drawback such that a continuity on a mapping boundary is not maintained.

The conventional color space compressing method has the following drawbacks.

(1) When the number of colors out of the color reproduction range is small, if the color space compressing method of FIG. 13A is used, the total color changes.

(2) When the number of colors out of the color reproduction range is large, if the color space compressing method of FIG. 13B is used, the color reproduction out of the range is limited to the size of surface area of the color reproduction range, so that a gradation is lost.

(3) In case of a gradation including the colors out of the color reproduction range from the inside of the color reproduction range, if the color space compressing method of FIG. 13C using the linear mapping is used, the color becomes discontinuous at a mapping boundary.

SUMMARY OF THE INVENTION

The present invention is made in consideration of the above drawbacks and it is an object of the invention to eliminate a discontinuous portion and to allow a compression result of a color space to have a good gradation.

Another object of the invention is to faithfully reproduce in a predetermined range by a linear mapping and not to cause a discontinuous portion at a boundary of a linear mapping and a non-linear mapping.

Still another object of the invention is to provide a color space compressing process according to an application of the user.

Under the above objects, according to the preferred embodiment of the invention, there is provided an image processing apparatus comprising: input means for inputting image data; and color space compressing means for performing a color mapping to the input image data by a combination of a linear mapping and a non-linear mapping.

Further, according to the preferred embodiment of the invention, there is provided an image processing apparatus comprising input means for inputting image data; a linear mapping mode for performing a linear mapping to the image data; a non-linear mapping mode for performing a non-linear mapping to the image data; and manual selecting means for manually selecting either one of the linear mapping mode and the non-linear mapping mode.

The above and other objects and features of the present invention will become apparent from the following detailed description and the appended claims with reference to the accompanying drawings.

BRIEF DESCRIPTION OF THE DRAWINGS

FIG. 10 is an explanatory diagram showing an example of a color space compression control;

FIG. 11 is a diagram showing an example of a color space compression option;

DETAILED DESCRIPTION OF THE PREFERRED EMBODIMENTS

Embodiment 1

The first embodiment of the present invention is described in detail hereinbelow with reference to the drawings.

Figure 1A:
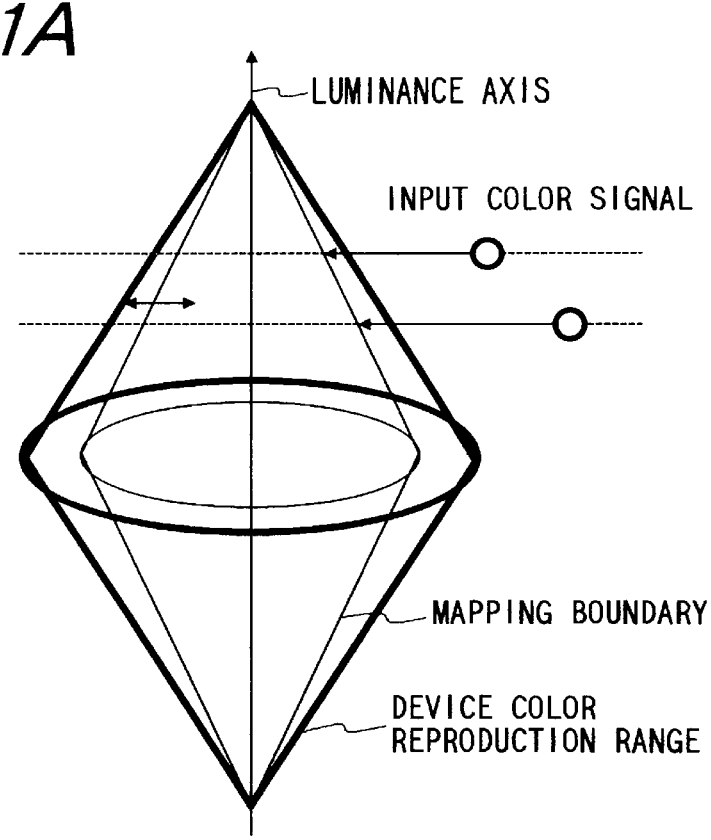
FIGS. 1A and 1B are conceptual diagrams of an embodiment 1.
Figure 1B:
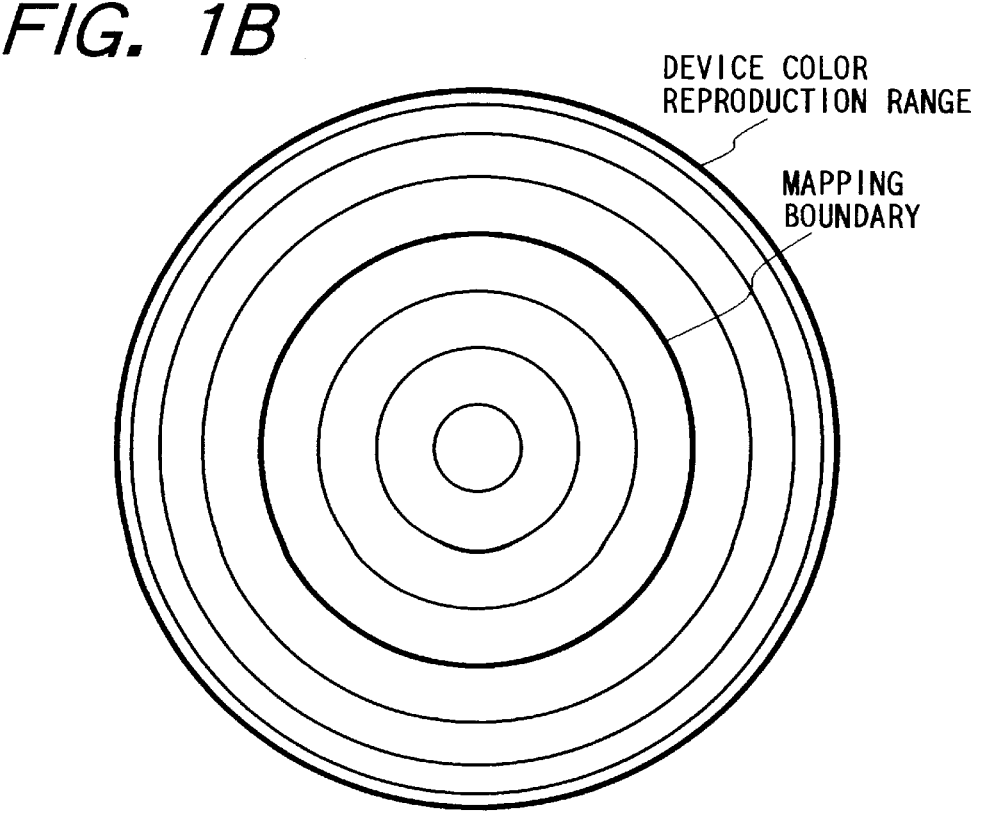

A concept of a color space compressing method in the embodiment is now described with reference to FIGS. 1A and 1B. As shown in FIG. 1A, input color signals out of a mapping boundary including input color signals out of a device color reproduction range are mapped into a region between the mapping boundary and the device color reproduction range while keeping luminances. In the embodiment, a mapping boundary according to an input image is set. As shown in FIG. 1B, on an equal luminance plane, the input color signals are non-linearly mapped in a manner such that the colors are faithfully reproduced in the mapping boundary and the color space becomes dense as the luminance approaches the device color reproduction range. According to the color space compressing method of the embodiment, a discontinuous point at the gradation is extinguished and the colors are reproduced with good gradations in all of the gradations. Further, the gradations out of the device color reproduction range are also preferably reproduced. Since the colors are faithfully reproduced in the mapping boundary, an atmosphere of the input image is maintained.

Image processing apparatus and method to realize the above color space compressing method are now described hereinbelow.

Figure 2:
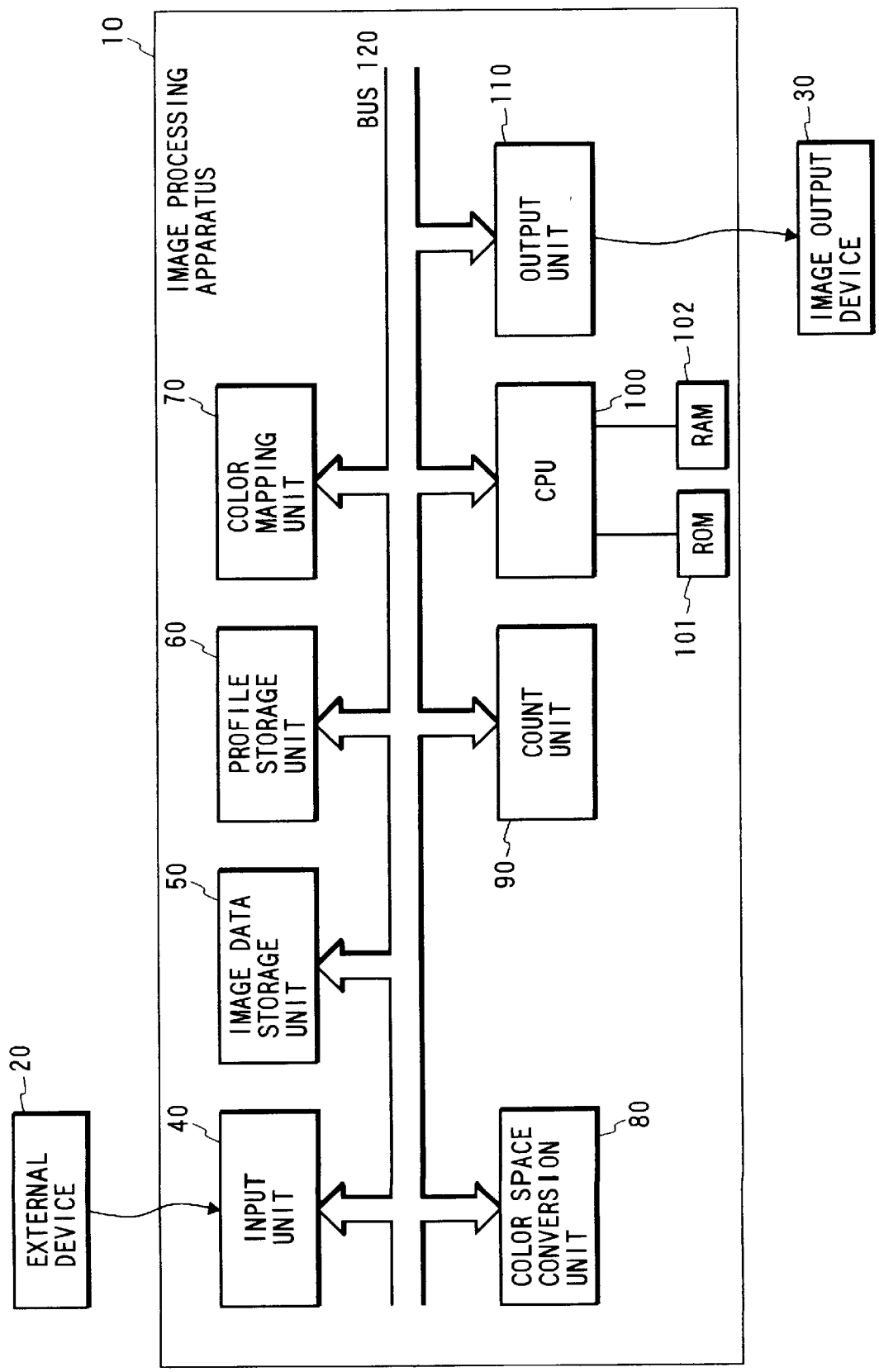
FIG. 2 is a block diagram showing an example of a construction of an image processing apparatus according to the invention.

FIG. 2 shows a block diagram according to the embodiment. An external device 20 transfers image data to an image processing apparatus 10 such as scanner, host, video, film scanner, or the like. An image output device 30 is an image output device such as monitor, printer, or the like. The image processing apparatus 10 is constructed by: an input unit 40 for inputting input color signals such as RGB data, a video signal, or the like indicative of an image from the external device; a color space conversion unit 80 for performing a color space conversion from the color space of the input color signals into a color space to execute a color mapping process, namely, into an L*a*b* space or for performing a conversion opposite to such a color space conversion; an image data storage unit 50 for storing L*a*b* image data; a profile storage unit 60 for storing a device profile as data indicative of the device color reproduction range of the image output device 30 such as monitor, printer, or the like or characteristics of a device such as a γ curve or the like of the monitor in correspondence to the device; a count unit 90 for counting the number of input color signals out of the device color reproduction range judged by a CPU 100; the CPU 100 executes a judgment about whether the input color signal is out of the device color reproduction range or not, a control of the mapping boundary, a determination of a non-linear color mapping function, and the like by using a RAM 102 in accordance with programs stored in a ROM 101; a color mapping unit 70 for performing a color mapping process; an output unit 110 for outputting the image data to the image output device 30; and a bus 120.

Figure 4:
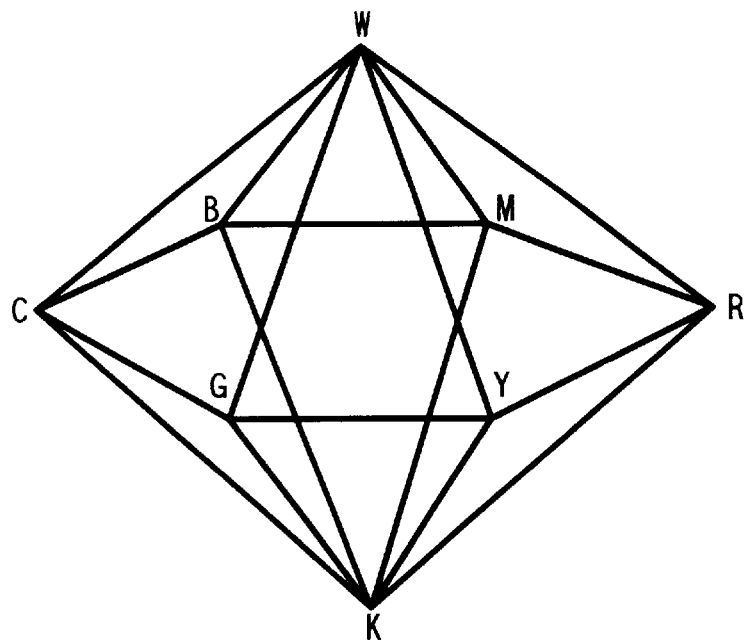
FIG. 4 is a diagram showing an example of a color reproduction range.

For example, as shown in FIG. 4, the device color reproduction range data stored in the profile storage unit 60 is stored in a manner such that eight points of R, G, B, C, M, Y, W, and K are made to correspond to the device.

Figure 3:
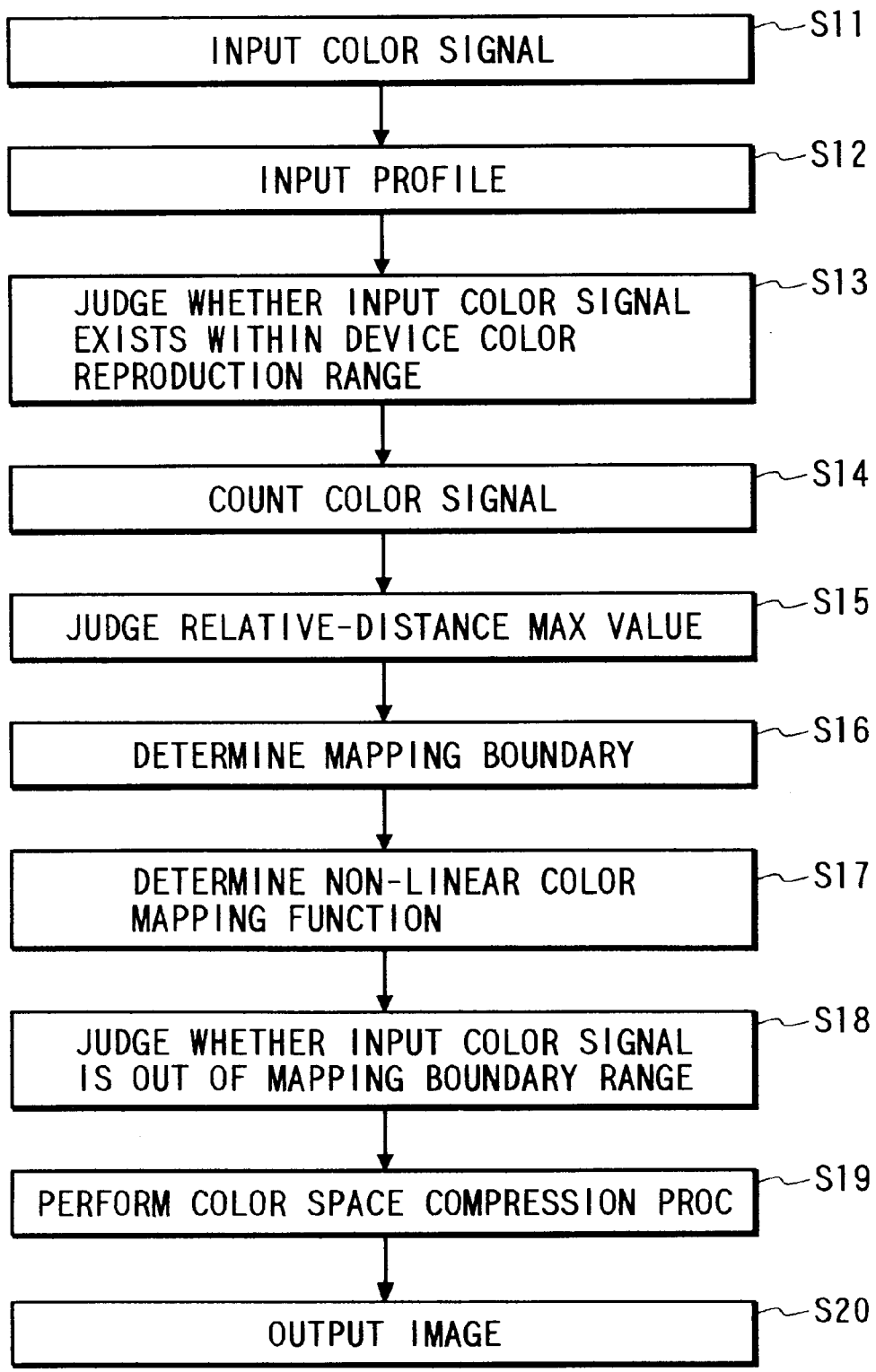
FIG. 3 is a flowchart showing an example of the operation according to the embodiment 1.

An operating procedure is shown in FIG. 3.

S11 denotes a step of inputting input color signals indicative of an image; S12 a profile input step of inputting a device profile corresponding to the image output device 30 as a target; S13 a judging step of judging whether the input color signals exist in the device color reproduction range of the color space coordinate system or not; S14 a counting step of counting the number of color signals which were judged such that they are out of the device color reproduction range; S15 a judging step of judging a value in which a relative-distance is maximum; and S16 a mapping boundary control step of deciding the mapping boundary from a ratio between the number of pixels out of the device color reproduction range and the total number of pixels. In step S17, a non-linear color mapping function is determined from the input color signals which were judged in the judgment in step S13 such that they are out of the device color reproduction range. In step S18, a check is made to see if the input color signals are out of the mapping boundary determined in step S16. In step S19, a color space compressing process is executed on the basis of the non-linear color mapping function decided in step S17 for the input color signals which were judged to be out of the mapping boundary in step S16. The color space compressing process is not executed for the input color signals which were judged to be in the mapping boundary. In step S20, the processing result in step S19 is outputted as image data to the image output device.

Judgment about whether the input color signals are out of the device color reproduction range The CPU 100 discriminates whether the input colors exist in the device color reproduction range derived in profile input step S12. Specifically, as mentioned above, for example, in the case where the device color reproduction range is defined by eight points of R (red), G (green), B (blue), Y (yellow), M (magenta), C (cyan), W (white), and K (black), those eight points are converted into coordinate values of a color space coordinate system (CIE LAB, CIE LUV, etc.). For example, the device color reproduction range is approximated by a dodecahedron which is formed by six points of R, G, B, Y, M, and C and a ridge line of W and K as shown in FIG. 4.

When the points existing in the device color reproduction range for the dodecahedron and the points of the pixel colors are located on the same side, it is judged that the pixel colors exist in the device color reproduction range. When those points are located on the opposite sides, it is judged that the pixel colors exist out of the device color reproduction range.

Mapping boundary control

The number of pixels which were judged to be out of the device color reproduction range by judging step S13 are counted in counting step S14.

In mapping boundary control step S16, a ratio of the number of pixels out of the device color reproduction range to the total number of pixels is calculated and the position of the mapping boundary is controlled by a value of the ratio of the pixels out of the range.

A control is performed so as to move the mapping boundary to the position that is equal to the device color reproduction range when the ratio of the pixels out of the range is equal to 0 and to move the mapping boundary to the position at which, for example, the device color reproduction range is reduced toward a convergent point by only $\alpha_{max}$ ($\alpha_{max} \leq \alpha \leq 1$) when the ratio is equal to 1.

(ratio of the pixels out of the range)=(the number of pixels out of the device color reproduction range)/(the total number of pixels)     (1.1)

(mapping boundary position α)=1−(1−$\alpha_{max}$)·(ratio of the pixels out of the range)     (1.2)

The convergent point is a convergent point of the color space compression. In the embodiment, therefore, since the luminances of the input color signals are maintained and the mapping is performed, the convergent point is a point locating on a center axis of the color space coordinate system in which the pixels out of the device color reproduction range and brightnesses are equalized.

Non-linear mapping function

The CPU 100 judges the non-linear color mapping function from the pixels which were judged to be out of the device color reproduction range.

Figure 5:
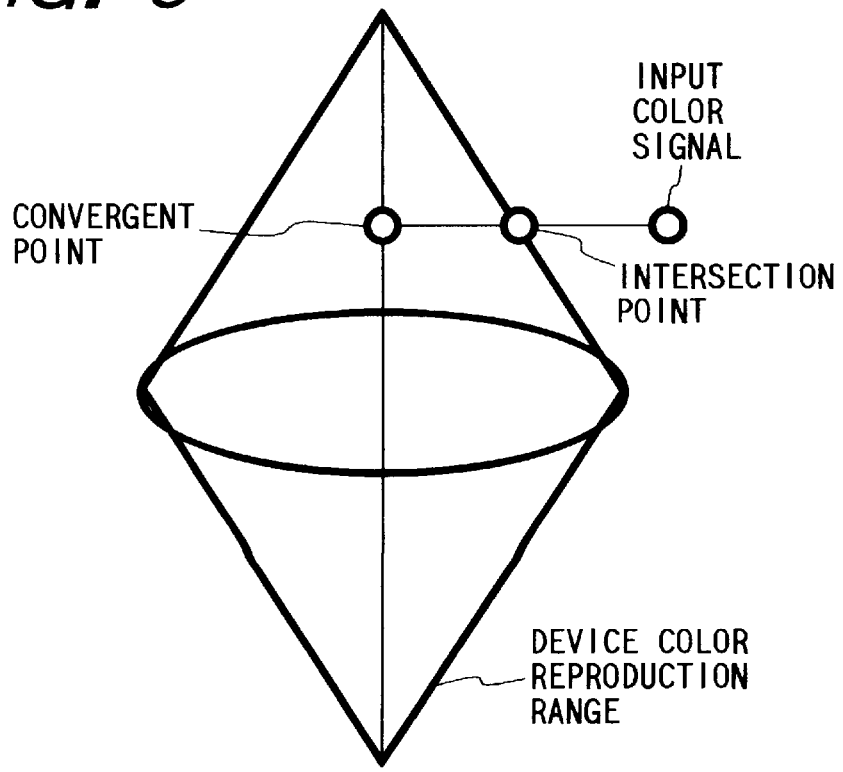
FIG. 5 is an explanatory diagram of a relative-distance.

For example, in case of performing a color space compression along a locus connecting the color signals out of the range and the convergent point, an intersection point between the locus and the surface of the device color reproduction range is obtained as shown in FIG. 5, and a relative position is obtained by (distance from the convergent point to the input color signal)/(distance from the convergent point to the intersection point) (1.3)

The relative distances are obtained with respect to all of the input color signals and the value of the largest relative distance is set to a relative position $P_{max}$ ($\geq 1$) of the color signal that is farthest from the device color reproduction range.

Now, assuming that the relative position of the surface of the device color reproduction range is set to 1 and the position at which the device color reproduction range is reduced toward the convergent point by only $\alpha$ is set to the position of the mapping boundary ($\alpha_{max} \leq \alpha \leq 1$) and the maximum relative position is set to $P_{max}$, when the relative position of the input color signal for the mapping boundary is equal to P ($\geq \alpha$), a relative position P for the mapping boundary after completion of the mapping can be expressed by a non-linear color mapping function of the following equation.

$$P' = P - (P_{max} - 1) \cdot \{(P - \alpha)/(P_{max} - \alpha)\}^n \quad (1.4)$$

here, n is a non-linear degree index.

A degree of non-linearity is changed by $$1 < n \leq (P_{max} - \alpha)/(P_{max} - 1) \quad (1.5)$$

Figure 6:
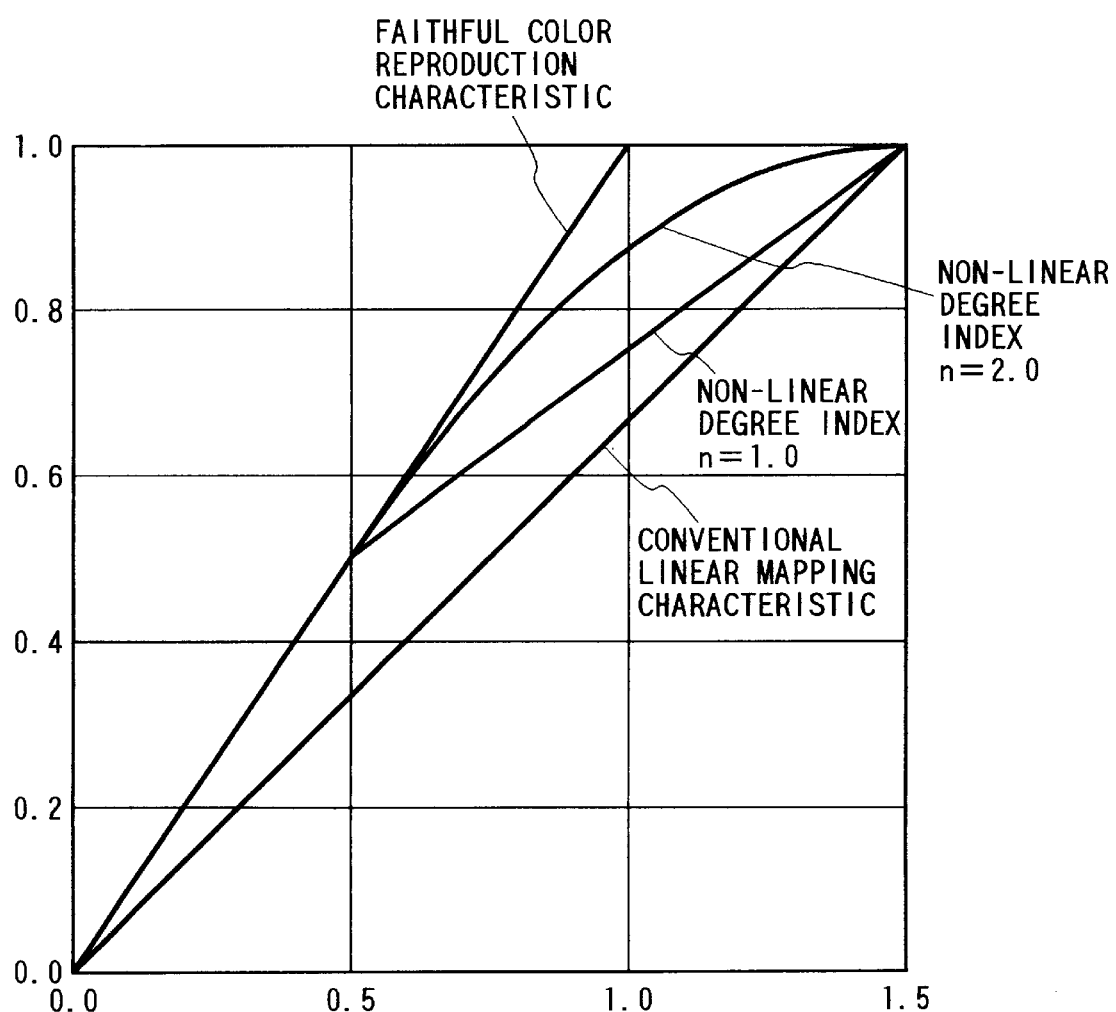
FIG. 6 is a diagram showing an example of characteristics of the embodiment 1.

(when n=1, a discontinuous function is obtained). When n is large, the mapping to a region near the surface of the device color reproduction range becomes dense, and when n is small, the mapping becomes coarse (refer to FIG. 6).

The non-linear color mapping function of the equation (1.4) is a function which is continuous to the faithful color reproduction region on the mapping boundary (P=$\alpha$).

Non-linear color mapping

For example, in the case where the device color reproduction range is defined by eight points of R, G, B, Y, M, C, W, and K, assuming that the mapping boundary is set to the position at which the saturation is reduced toward the convergent point by only $\alpha$, eight points are reduced toward the convergent point in the saturation direction by only $\alpha$ in the color coordinate system. On the basis of those eight points, a check is made to see if the input color signals exist in the mapping boundary.

When the input color signals are out of the mapping boundary, the position after the mapping is obtained by using the relative-distance from the convergent point and the non-linear color mapping function.

For example, in case of performing the color space compression along the locus connecting the color signals out of the mapping boundary and the convergent point, an intersection point of the locus and the mapping boundary is obtained and the relative position is calculated by the equation (1.3). Subsequently, by substituting the relative position into the equation (1.4), the position after completion of the mapping is obtained.

On the other hand, no process is executed if the input color signals exist within the mapping boundary.

According to the embodiment 1 as mentioned above, when the number of colors out of the color reproduction range is small, the position of the mapping boundary for the color reproduction range is allowed to approach the surface of the color reproduction range and, when the number of colors out of the range is large, the position of the mapping boundary is allowed to approach the convergent point of the color space compression and the parameter of the non-linear mapping is controlled.

Figures 12A, 12B:
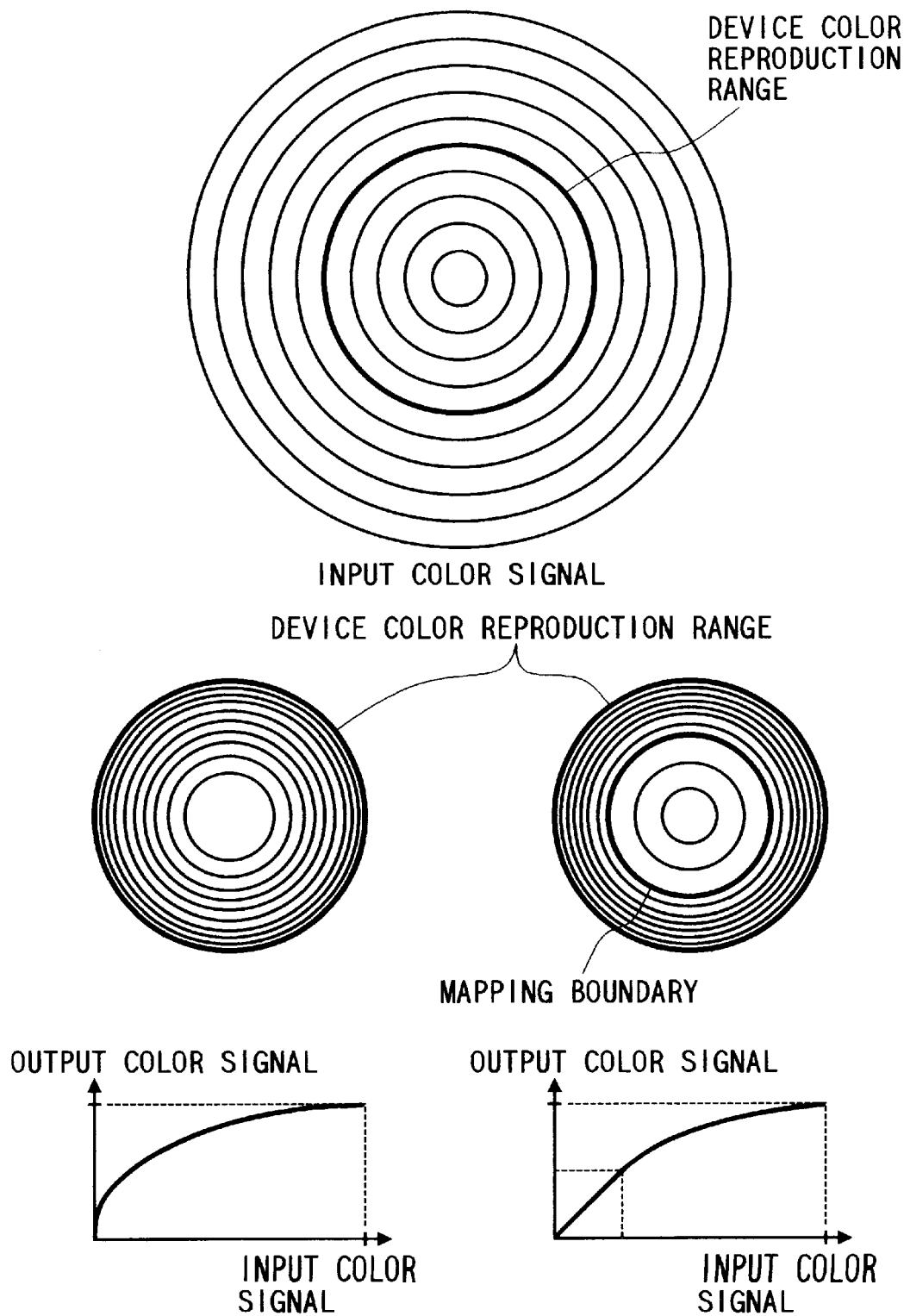
FIGS. 12A and 12B are conceptual diagrams and characteristics diagrams according to the invention.
Figures 13A, 13B, 13C:
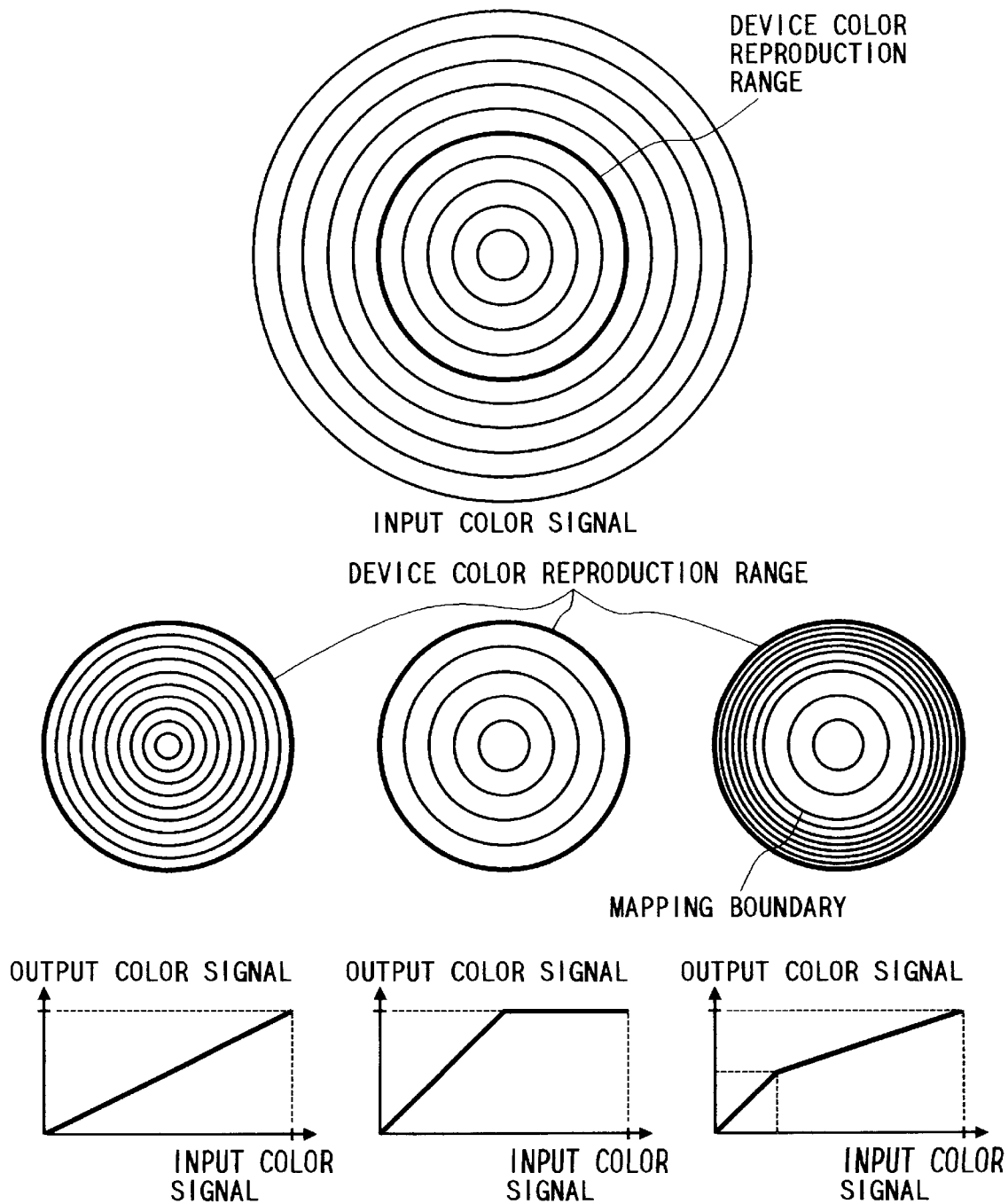
FIGS. 13A to 13C are conventional conceptual diagrams and characteristics diagrams.

Therefore, as shown in FIG. 12B, the faithful color reproduction region for performing the faithful color reproduction and the mapping color reproduction region for non-linearly mapping the colors out of the faithful color reproduction region are provided in the color reproduction range. In accordance with the ratio of the total number of pixels and the number of pixels out of the color reproduction range, the mapping boundary as a boundary of those two regions is changed, and the parameter of the non-linear mapping is determined so as to maintain continuity of the faithful color reproduction region and the mapping color reproduction region. With this construction, the color space compression result is optimized while maintaining the continuity.

Embodiment 2

Figure 7:
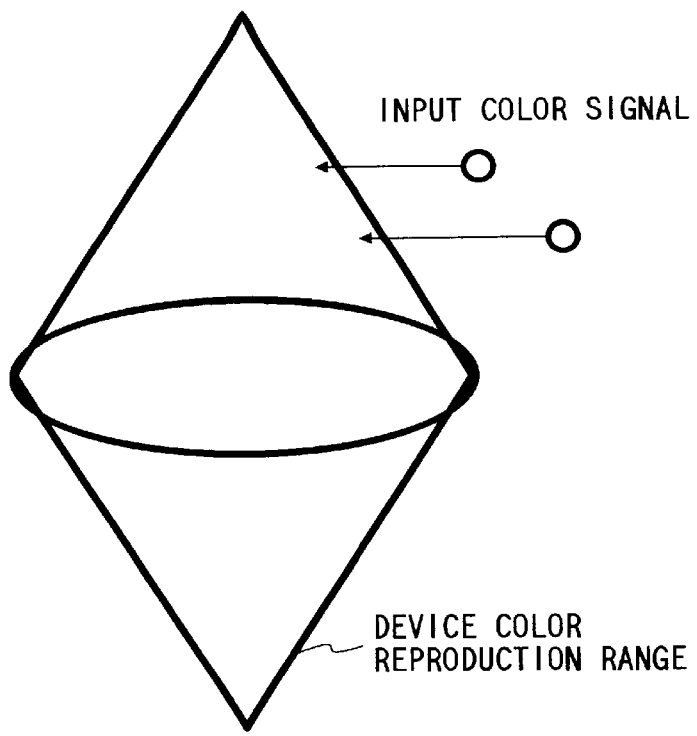
FIG. 7 is a conceptual diagram of an embodiment 2.
Figure 8:
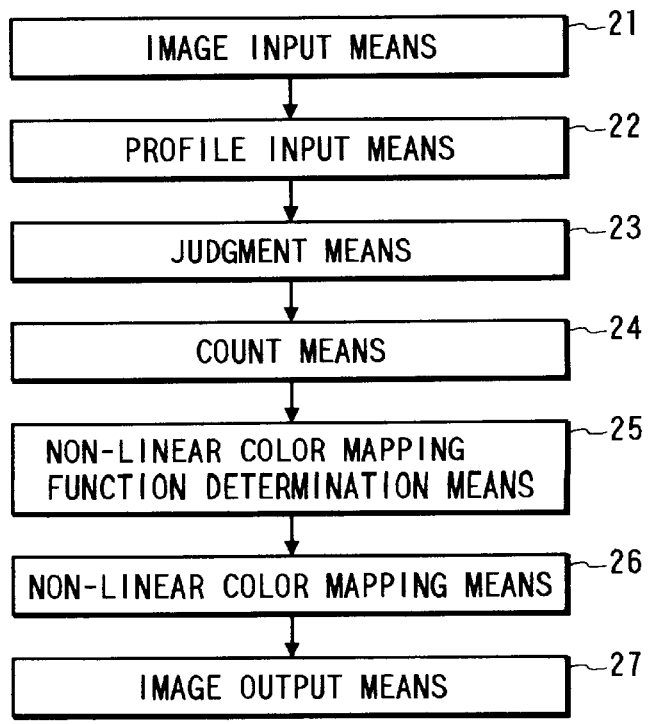
FIG. 8 is a block diagram showing an example of a construction of an image processing apparatus of the embodiment 2 according to the invention.

FIG. 7 shows a conceptual diagram of the invention. FIG. 8 shows its construction.

In FIG. 8, reference numeral 21 denotes image input means for inputting images from a scanner, a video signal, a CG editor, a file, and the like; 22 a profile input means for inputting a device profile such as device color reproduction range of a scanner, a monitor, a printer, or the like or a γ curve of a monitor; 23 judgment means for judging whether each pixel of the image inputted by the image input means 21 exists in a region where the color space coordinate system exists or not; 24 count means for counting the number of pixels judged by the judgment means 23 such that they are out of the device color reproduction range inputted by the profile input means 22; 25 non-linear color mapping function determination means for obtaining a non-linear degree index and a non-linear color mapping function from the ratio between the number of pixels out of the device color reproduction range obtained by the count means 24 and the total number of pixels and the value of the relative position that is farthest from the device color reproduction range; 26 non-linear color mapping means for mapping each pixel of the image inputted by the image input means 21 by the non-linear color mapping function obtained by the non-linear color mapping function determination means 25; and 27 image output means for outputting the image derived by the non-linear color mapping means 26 to the monitor and printer.

The following processes are executed with respect to each pixel of the image obtained by the image input means 21.

Judgment about in/out of the device color reproduction range

The Judgment means 23 judges whether the pixel colors exist in the device color reproduction range derived by the profile input means 22 or not.

For example, when the device color reproduction range is defined by eight points of R (red), G (green), B (blue), Y (yellow), M (magenta), C (cyan), W (white), and K (black), those eight points are converted into coordinate values of the color space coordinate system (CIE LAB, CIE LUV, etc.) and, for example, the device color reproduction range is approximated by a dodecahedron which is formed by six points of R, G, B, Y, M, and C and a ridge line of W and K as shown in FIG. 4.

When the points existing in the device color reproduction range for the dodecahedron and the points of the pixel colors are located on the same side, it is judged that the pixel colors exist in the device color reproduction range. When they are located on the opposite sides, it is judged that the pixel colors exist out of the device color reproduction range.

Control of non-linear degree and non-linear color mapping function

The number of pixels which were judged by the judgment means 23 such that they are out of the device color reproduction range is counted by the count means 24.

The non-linear color mapping function determination means 25 calculates a ratio of the number of pixels out of the device color reproduction range to the total number of pixels and executes a control of the non-linear degree and a determination of the non-linear color mapping function by the value of the ratio of the pixels out of the range.

The ratio of the pixels out of the range is first obtained by the following equation.

(ratio of the pixels out of the range)=(the number of pixels out of the device color reproduction range)/(the total number of pixels) (2.1)

The relative position of the color signal in which the ratio of the device color reproduction range and the saturation in the same hue and same brightness is largest is obtained.

For example, in case of performing the color space compression along a locus connecting the color signals out of the range and the convergent point, an intersection point between the locus and the surface of the device color reproduction range is obtained as shown in FIG. 4 and the relative position is calculated by (distance from the convergent point to the input color signal)/(distance from the convergent point to the intersection point) (2.2)

The relative distances are obtained with respect to all of the input color signals and the value of the largest relative distance is set to the relative position $P_{max}$ ($\geq 1$) of the color signal that is farthest from the device color reproduction range.

The convergent point is a convergent point of the color space compression and, for example, is a point located on a center axis of a color space coordinate system in which the pixels out of the device color reproduction range and the brightnesses are equalized.

From the equations (2.1) and (2.2), now assuming that the relative position of the surface of the device color reproduction range is set to 1 and the maximum relative position is set to $P_{max}$ and the relative position of the input color signal for the surface of the device color reproduction range is set to P, a non-linear color mapping function to obtain the relative position P' after completion of the mapping is obtained by the following equation.

$$P'=P-(P_{max}-1)\cdot(P/P_{max})^n \quad (2.3)$$

(where, n is a non-linear degree index)

(non-linear degree index $n$)=1−(ratio of the pixels out of the range)/($P_{max}$−1) (2.4)

Figure 9:
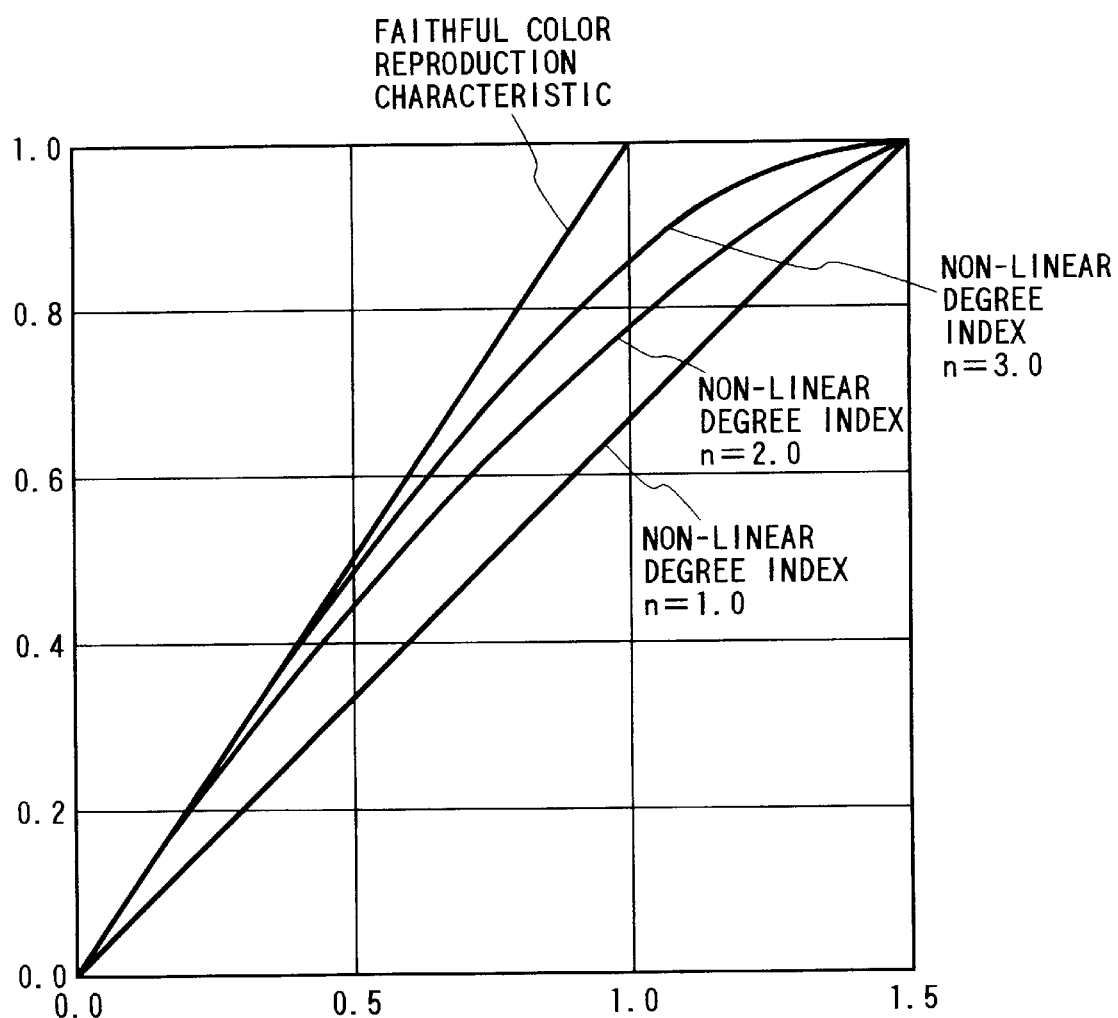
FIG. 9 is a diagram showing an example of characteristics of the embodiment 2.

Thus, a control is executed in a manner such that when the ratio of the pixels out of the range is equal to 0, the linear mapping in which all of the input colors are faithfully color reproduced is performed and, when the ratio is equal to 1, the non-linear mapping in which region near the surface of the device color reproduction range is most dense is performed (refer to FIG. 9).

Non-Linear color mapping

For example, in the case where the device color reproduction range is defined by eight points of R, G, B, Y, M, C, W, and K, the position after the mapping is obtained from the relative-distance between the input color signal and the device color reproduction range and the non-linear color mapping function.

For example, in case of performing the color space compression along a locus connecting the input color signals and the convergent point, an intersection point between the locus and the device color reproduction range is obtained, thereby calculating the relative position by the equation (2.2). Subsequently, by substituting the relative position into the equation (2.3), the position after the mapping is obtained. An image after completion of the color space compressing process is outputted by the image output means 27.

According to the embodiment 2 as mentioned above, the non-linear parameter is controlled so as to make the mapping dense in a region near the surface of the color reproduction range when the number of colors out of the color reproduction range is small and to make the mapping coarse in a region near the surface of the color reproduction range when the number of colors out of the range is large.

Therefore, as shown in FIG. 12A, by changing the degree of non-linearity in accordance with the ratio between the total number of pixels and the number of pixels out of the color reproduction range, an effect such as to perform the control of the mapping boundary is obtained.

Embodiment 3

An image processing apparatus having a user interface such that the user can determine (or adjust) the position of the mapping boundary in the embodiment 1 and the non-linear degree index in the embodiment 1 or 2.

For example, an image processing apparatus having a user interface such that a proper value can be set by inputting the mapping boundary and non-linear degree by the user as shown in FIG. 10.

For example, an image processing apparatus having a user interface such that one or a plurality of kinds of fixed combinations of the mapping boundary and non-linear degree are previously prepared and the user can select a proper combination as shown in FIG. 11.

On the basis of the mapping boundary and non-linear degree which were set by such a user interface, the CPU sets a color mapping process of the color mapping unit 70.

As mentioned above, since the user can arbitrarily set (adjust) the mapping boundary or non-linear degree, the user can execute a desired color mapping process.

Modifications

In the color space compressing method of the embodiment 1 or 2, it is also possible to fix the mapping boundary or non-linear degree index or to fix both of the mapping boundary and the non-linear degree index.

Further, the maximum relative value $P_{max}$ of the input color signals can also be fixed.

In the color space compressing method of the embodiment 1 or 2, the brightness and the saturation or all of the hue, brightness, and saturation can also be varied.

The processing result of the embodiment 1 or 2 is stored in a look-up table and the color space compression can also be executed.

The number of pixels out of the device color reproduction range and the maximum relative position of the count means in the embodiment 1 or 2 can also be obtained from the sampling value of the input color signal.

As described above, a discontinuous portion is eliminated and the gradation of the good result of the color space compression is retained.

Further, since the color space compression is performed on the basis of the non-linear mapping function, a degree of the total color change can be reduced for the colors in the color reproduction range and can be enlarged for the colors out of the color reproduction range.

The colors in a predetermined range can be faithfully reproduced by the linear mapping, thereby making it possible to prevent that a discontinuous point occurs at the boundary between the linear mapping and the non-linear mapping.

A color space compressing process according to an application of the user can also be provided.

The present invention is not limited to the foregoing embodiments and many modifications and variations are possible within the spirit and scope of the appended claims of the invention.

What is claimed is:

1. An image processing apparatus comprising:

input means for inputting image data representing an image;

judgement means for judging a color distribution of the image on the basis of the input image data;

generation means for generating a color mapping condition so as not to appear discontinuous in a combined portion of linear mapping and non-linear mapping, on the basis of a combination condition of linear mapping and non-linear mapping according to the judged color distribution; and process means for performing a color mapping process by using the generated color mapping condition.

2. An apparatus according to claim 1, wherein said generation means controls a mapping boundary as a boundary between a linear mapping range to excite said linear mapping and a non-linear mapping range to perform said non-linear mapping.

3. An apparatus according to claim 2, wherein said generation means controls the mapping boundary in accordance with the color distribution of the input image.

4. An apparatus according to claim 1, wherein no discontinuous point occurs near the boundary between a linear mapping range for performing said linear mapping and a non-linear mapping range for performing said non-linear mapping.

5. An apparatus according to claim 1, further comprising:

image forming means for forming an image on the basis of image data on which the color mapping process is performed.

6. An image processing method comprising:

an input step of inputting image data representing an image;

a judgement step of judging a color distribution of the image on the basis of the input image data;

a generation step of generating a color mapping condition so as not to appear discontinuous in a combined portion of the linear mapping and non-linear mapping, on the basis of a combination condition of linear mapping and non-linear mapping according to the judged color distribution; and a process step of performing a color mapping process by using the generated color mapping condition.

7. An image processing method comprising:

an input step of inputting a user's instruction concerning a combination ratio of an area to faithfully perform mapping and an area to perform non-linear mapping; and a setting step of setting a color mapping condition so as not to appear discontinuous at a boundary portion of the area to faithfully perform mapping and the area to perform non-linear mapping.

8. A method according to claim 7, wherein the color mapping condition is set based on the user's instruction concerning a degree of non-linearity.

9. An apparatus according to claim 7, further comprising:

a color gamut mapping step of performing a color gamut mapping corresponding to the set color gamut mapping condition, for image data.

10. An image processing apparatus comprising:

input means for inputting a user's instruction concerning a combination ratio of an area to faithfully perform mapping and an area to perform non-linear mapping;

setting means for setting a color mapping condition so as not to appear discontinuous at a boundary portion of the area to faithfully perform mapping and the area to perform non-linear mapping; and color gamut mapping means for performing a color gamut mapping corresponding to the set color gamut mapping condition, for image data.

11. An apparatus according to claim 10, further comprising:

image forming means for forming an image on the basis of image data on which the color mapping process is performed.

* * * * *

UNITED STATES PATENT AND TRADEMARK OFFICE
CERTIFICATE OF CORRECTION

PATENT NO. : 6,041,136
DATED : March 21, 2000
INVENTOR(S) : Manabu Ohga

It is certified that error appears in the above-identified patent and that said Letters Patent is hereby corrected as shown below:

Column 1:
Line 13, "13A" should read -- 13A: --;
Line 18, "13B" should read -- 13B: --;
Line 23, "13C" should read -- 13C: --.

Column 4:
Line 17, "Judgment" should read -- (Judgment --;
Line 18, "range" should read -- range) --;
Line 37, "Mapping boundary control" should read -- (Mapping boundary control) --;
Line 67, "Non-linear mapping function" should read -- (Non-linear mapping function) --.

Column 5:
Line 34, "here," should read -- where, --;
Line 46, "Non-linear color mapping" should read -- (Non-linear color mapping) --.

Column 6:
Line 57, "Judgment" should read -- (Judgment --;
Line 58, "range" should read -- range) --.

Column 7:
Line 10, "Control" should read -- (Control --;
Line 11, "function" should read -- function) --.

UNITED STATES PATENT AND TRADEMARK OFFICE
CERTIFICATE OF CORRECTION

PATENT NO. : 6,041,136
DATED : March 21, 2000
INVENTOR(S) : Manabu Ohga

It is certified that error appears in the above-identified patent and that said Letters Patent is hereby corrected as shown below:

Column 8:
Line 6, "Non-Linear color mapping" should read -- (Non-linear color mapping) --.

Column 10:
Line 32, "An apparatus" should read -- A method --.

Signed and Sealed this

Eighteenth Day of September, 2001

Attest:

*Nicholas P. Godici*

NICHOLAS P. GODICI
*Attesting Officer*   *Acting Director of the United States Patent and Trademark Office*